(12) United States Patent
Kahn

(10) Patent No.: US 9,140,065 B2
(45) Date of Patent: Sep. 22, 2015

(54) LADDER CLIP FOR HANGING TOOLS FROM A LADDER

(71) Applicant: Peter Kahn, Brookhaven, NY (US)

(72) Inventor: Peter Kahn, Brookhaven, NY (US)

( * ) Notice: Subject to any disclaimer, the term of this patent is extended or adjusted under 35 U.S.C. 154(b) by 84 days.

(21) Appl. No.: 13/998,340

(22) Filed: Oct. 23, 2013

(65) Prior Publication Data

US 2015/0108302 A1    Apr. 23, 2015

(51) Int. Cl.
*E06C 7/14* (2006.01)
*F16M 13/02* (2006.01)

(52) U.S. Cl.
CPC ............... *E06C 7/143* (2013.01); *F16M 13/02* (2013.01); *F16M 13/022* (2013.01)

(58) Field of Classification Search
USPC .......... 248/115, 116, 210, 211, 238; 182/141, 182/142, 206
See application file for complete search history.

(56) References Cited

U.S. PATENT DOCUMENTS

| | | | | |
|---|---|---|---|---|
| 3,907,118 A | * | 9/1975 | Pelavin | 211/113 |
| 5,275,256 A | * | 1/1994 | Ellzey | 182/103 |
| 6,003,633 A | * | 12/1999 | Rolson | 182/127 |
| 6,244,548 B1 | * | 6/2001 | Gillette | 248/210 |
| 6,913,114 B1 | * | 7/2005 | Blehm | 182/214 |
| 8,157,055 B2 | * | 4/2012 | Stark et al. | 182/107 |

\* cited by examiner

*Primary Examiner* — Steven Marsh
(74) *Attorney, Agent, or Firm* — Jonathan E. Grant; Grant Patent Sevice

(57) ABSTRACT

A ladder clip is taught that allows for the secure support of paint cans, brushes, and other tools from a ladder. The device consists of a platform, having vanes that secure the platform in place in the hollows of ladder rungs. Tools are hung from the platform extension that extends beyond the opening of the rungs. To remove the ladder clip, one simply pulls on the tab that extends from the vanes to the extension, and the vanes fold down, allowing for easy removal.

12 Claims, 2 Drawing Sheets

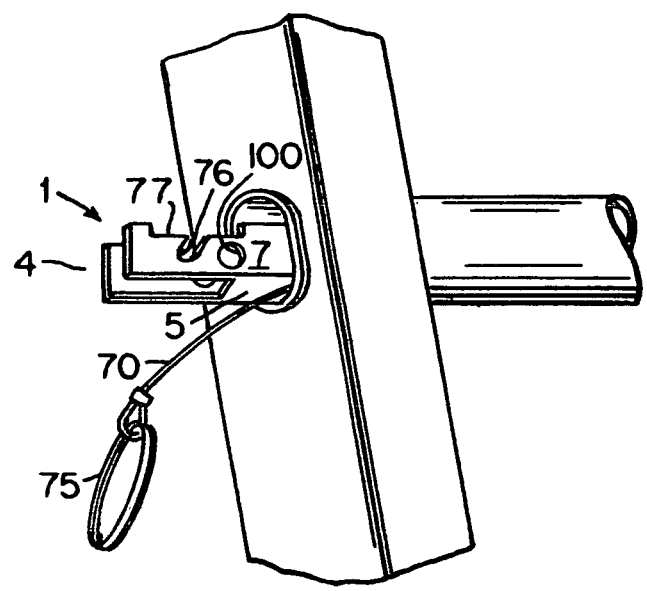
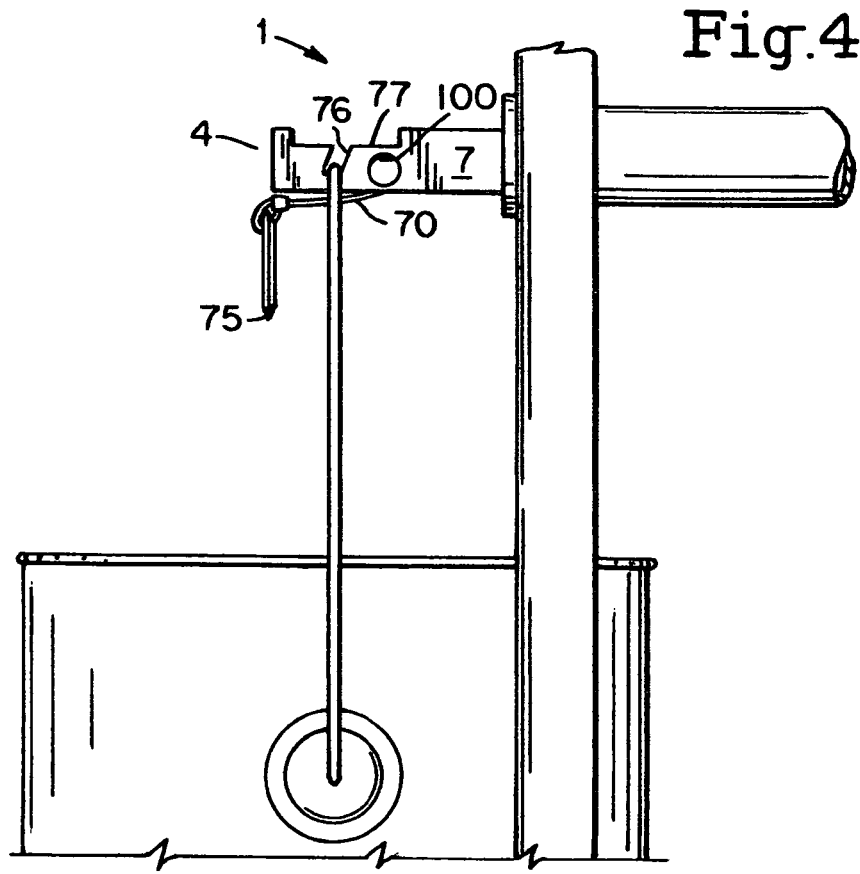

LADDER CLIP FOR HANGING TOOLS FROM A LADDER

BACKGROUND OF THE DISCLOSURE

One of the most frustrating aspects of painting is not being able to have all of the tools needed within easy reach. Painting, carpentry, electrical, telephone, satellite, landscaping, and roofing jobs require many different tools, and not having these tools handy slows down the job, endangers the workmen, and increases the chances of damaging what is below and dropping or breaking expensive tools.

SUMMARY OF THE DISCLOSURE

The present disclosure teaches a device which allows for a safe strong method of holding cans of paint and other tools on extension type ladders. The ladder clip of the present disclosure creates a safe and efficient workstation that helps workmen securely keep their important tools right by their side, when they need them.

In one embodiment a ladder clip fits within the opening of the rung joint in the sides of the stile. The ladder clip can be slipped into the opening where spring loaded grasping clips hold the ladder clip in position. An extension of the ladder clip frame extends from the ladder, and upon this extension piece tools or paint cans or anything else is hung. A loop attached to and extending from the spring loaded grasping clips releases the clip from the rung. This allows the user to move the clip to any other rung on the ladder or to push it in for traveling.

BRIEF DESCRIPTION OF THE FIGURES

FIG. 3 is a perspective view of the tool in use in the ladder;
FIG. 4 is a perspective of a paint can hanging from the rung of a ladder;

DETAILED DESCRIPTION OF THE DISCLOSURE

Figure 1:
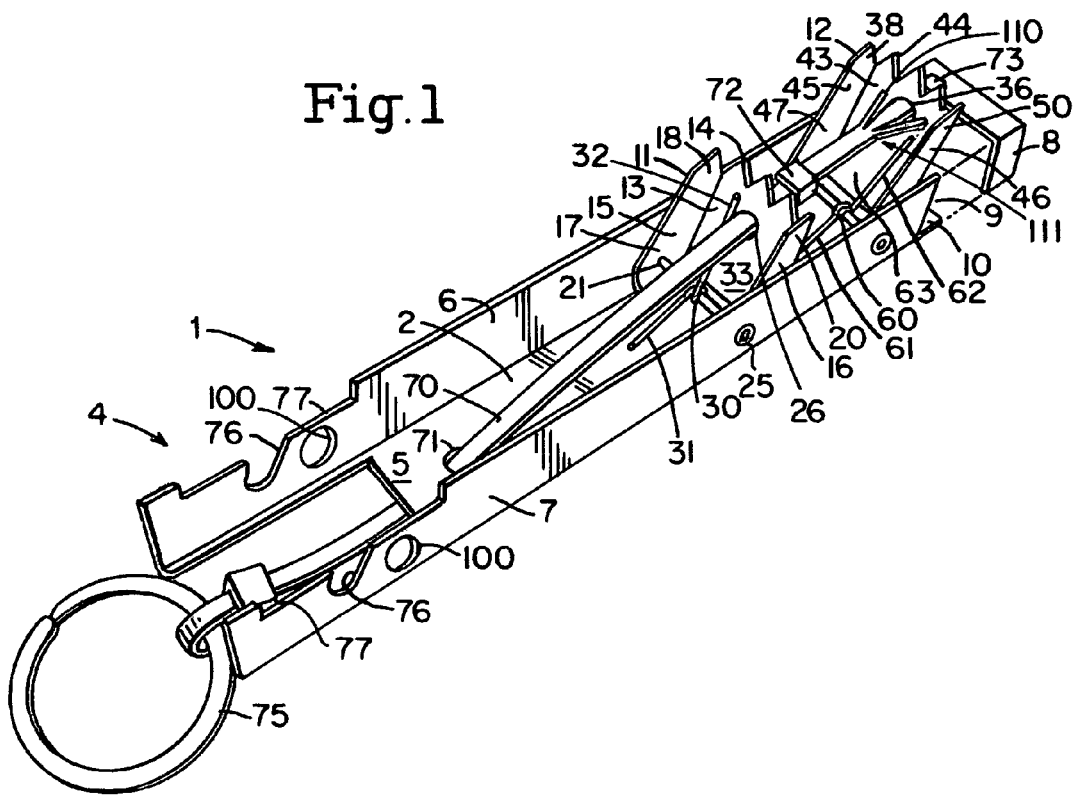
FIG. 1 is a perspective view of the tool.
Figure 2:
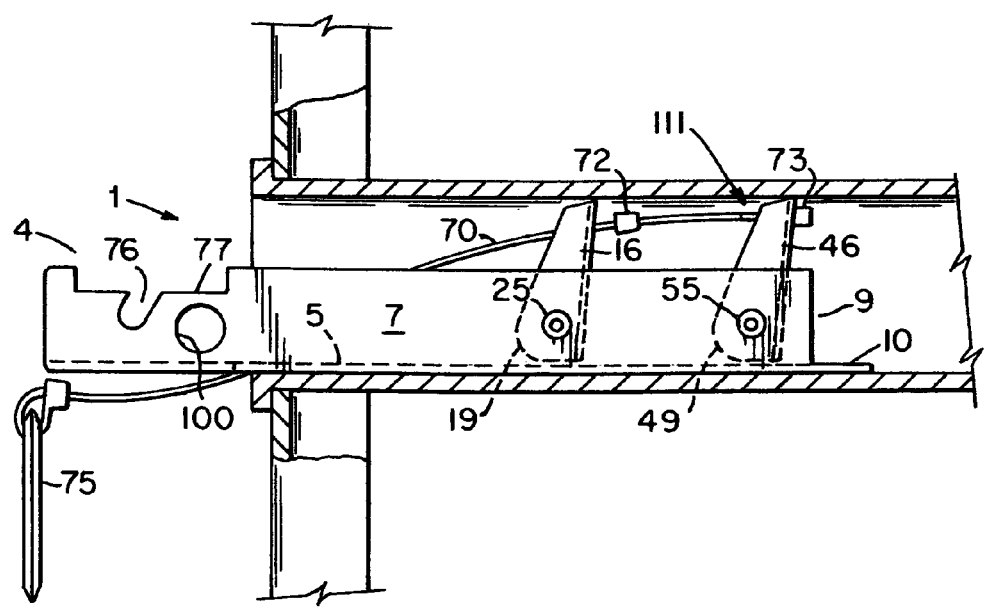
FIG. 2 is a cutaway view of the tool positioned within the opening of the rung joint.

The ladder clip 1 is comprised of a platform 2. The platform 2 has a distal end 3 and a proximal end 4. The platform 2 has a floor 5 a first wall 6 and a second wall 7. The first wall 6 and the second wall 7 are parallel to each other and perpendicular to the floor 5. In another embodiment, either of the first wall 6 or the second wall 7 are not perpendicular with the floor 5. In yet another embodiment, neither the first wall 6 nor the second wall 7 are perpendicular with the floor. In another embodiment the first wall 6 and the second wall 7 are not parallel to each other.

In one embodiment, the platform is made out of one stamped piece. In another embodiment the first wall 6 and/or the second wall 7 are welded to the floor 2.

The distal end 3 of the platform 2 is open 9. In another embodiment, a cap 8 closes the end of the platform. This cap 8 may be part of one contiguous piece of which is comprised the platform 2, or the cap may be a separate piece which has been welded to the platform.

In another embodiment, the floor 5 of the platform extends past the walls 6, 7, to from a small extension piece 10.

Positioned between and traversing said wall 6 and wall 7 is a retractable vane 11. In another embodiment there is a second retractable vane 12 positioned anywhere from one half to one inch or more behind the first retractable vane. The vanes is made up of a fin 13, 43 which extends between the walls. On the distal or top end of the fin are teeth like structures 14, 44 which are positioned to help secure the ladder clip inside the opening of the ladder rung, as will be explained infra.

In one embodiment, on side of and attached to the fin 13, 43 is a first guide piece 15, 45 and on the other side and attached to the fin 13, 43 is the second guide piece 16, 46. In one embodiment the first guide piece 15, 45 and the second guide piece 16, 46 are integral with the fin 13, 43. Both guide pieces 15, 45 and 16, 46 are positioned in near proximity with wall 6 and wall 7, respectively, and are positioned to face the proximal end 4 of the platform 2.

In one embodiment of the disclosure, the base 17, 47 of the first guide piece 15, 45 is broader than the top 18, 38 of the first guide piece 15, 45 and the base 19, 49 of the second guide piece 16, 46 is broader than the top 20, 50 of the second guide piece 16, 46. There is a hole 21, 51 through and perpendicular to the length the base 17, 47 of the first guide piece 15, 45 and a hole 22, 52 through the base 19, 49 of the second guide piece 16, 46. These holes are aligned with a hole 23, 53 in the first wall 6, 36 and a hole 24, 54 in the second wall 7, 37. An attachment bar in the form of a pin, rivet 25, 55 (as shown), nail, screw, or some other means known in the art goes through all of the walls and is secured by any method known in the art.

The fin 11, 41 has an opening 26, 36 positioned beneath the teeth like structures 14, 44.

The rivet 25, 55 also passes through the coil of a tension or torsion spring 30, 60. One arm 31, 61 of the spring 30, 60 resides on the floor 5 of the platform 2 and the other arm 32, 62 of the spring 30, 60 pushing on the underside 33, 63 of the fin 13, 43.

At the top of the fin, and underneath the teeth 14, 44 is a hole or opening 34, 64 positioned therein. A pull mechanism such as a string, small chain, cable, or elongated plastic tab 70 goes through openings 64 and 34 and through a hole or opening 71 in the floor 5 near the proximal end of the platform. There are stop knots or projections 72, 73, which prevent the pull mechanism from 70 from going through the openings 64 and 34 and they push the vanes down when pull mechanism 70 is pulled. In one embodiment, there is a ring, loop, or handle 75 at the end of the pull mechanism.

In one embodiment of the disclosure, there is at least set of parallel indentation 76 in the first and second walls. In another embodiment, there is the indentation, and a parallel set of cut out shelves 77 in the first and second walls. Another embodiment has a hole 100 positioned through walls 6 and 7 through which a caulking gun can be hung.

Another embodiment has two flexible offshoots 110, 111 extending from the elongated plastic tab 70 and facing the front side of the second retractable fin 12, thereby preventing the elongated plastic tab 70 from slipping through opening 36.

To use the ladder clip, the distal end of the clip 1 is inserted into one of the opening of the rungs found in the side rails of the ladder. The vanes may be pushed down as they enter the opening. Once in the opening, the teeth of the vanes hold the clip in place and the ladder clip platform extends beyond the opening of the ladder rung. At the proximal end of the clip, tools, brushes, and even paint cans can be hung securely and with confidence from the indentation 76. To remove the ladder clip, one merely pulls the ring at the end of the pull mechanism 70, and the vanes retract (fold down). The device can then be removed from inside the rung.

It is to be understood that even though numerous characteristics and advantages of the present embodiments have been set forth in the foregoing description with details of the structures and functions of the embodiments, the disclosure is illustrative only, and changes made in detail, especially in matters of shape, size, and arrangement of parts, within the principles of the embodiments, to the full extent indicated by the broad general meaning of the terms in which the appended claims are expressed.

What is claimed is:

1. A ladder clip, said ladder clip comprising:
   a) a platform, said platform comprising;
      i) a proximal end;
      ii) a distal end;
      iii) a floor;
      iv) a hole near a proximate end of said floor;
      v) a first wall contiguous with said floor a first longitudinal edge of said floor;
      vi) a second wall contiguous with a second longitudinal edge of said floor, said second wall being positioned opposite to said first wall;
      vii) a first hole positioned in said first wall;
      viii) a second hole positioned in said second wall, wherein said first hole and said second hole are aligned;
   b) a first retractable vane positioned between said first wall and said second wall, said retractable first vane comprising:
      i) a fin, said fin extending between said first wall and said second wall,
         A) said fin further comprising teeth like structures positioned at a distal end of said fin;
         B) a first guide piece positioned on a proximal side of a first side of said fin;
         C) a second guide piece positioned on a proximal side of a second side of said fin, such that an inside of said first guide piece and said second guide piece face each other;
         D) a first rivet hole in a bottom section of said first guide piece;
         E) a second rivet hole in a bottom section of said second guide piece;
   c) a tension or torsion coil spring comprising a coil, a first arm, and a second arm, wherein said first arm of said coil spring resides on said floor of said platform and said second arm of said spring pushes on an underside of the fin;
   d) an attachment mechanism, said attachment mechanism securely passing through said first hole of said first wall of said platform, said first rivet hole in said bottom section of said first guide piece, through said coiled spring, second rivet hole in said bottom section of said second guide piece, and said second hole of said second wall of said platform; and
   e) a pull mechanism, said pull mechanism passing through a hole in said fin, and continuing through said hole of said floor, said pull mechanism comprising a stop knot on a distal side of said fin.

2. The ladder clip of claim 1, wherein said platform is made out of one stamped piece.

3. The ladder clip of claim 1, wherein said at least one said wall is welded to the floor.

4. The ladder clip of claim 1, wherein said first wall and said second wall are parallel to each other.

5. The ladder clip of claim 1, where said first wall and said second wall are perpendicular to the floor.

6. The ladder clip of claim 1, wherein the distal end of said platform is open.

7. The ladder clip of claim 1, wherein the first guide piece and the second guide piece are integral with the fin.

8. The ladder clip of claim 1, wherein the first guide piece is positioned in near proximity of said first wall and said second guide piece are positioned in near proximity with said second wall and said first guide piece and said second guide piece are positioned to face the proximal end 4 of said platform.

9. The ladder clip of claim 1, wherein the in base of the first guide piece is broader than the top of the first guide piece and the base of the second guide piece is broader than the top of the second guide piece.

10. The ladder clip of claim 1, further comprising a ring or loop positioned at the proximal end of said pull mechanism.

11. The ladder clip of claim 1, further comprising a parallel set of indentations in the first wall and the second wall.

12. The ladder clip of claim 1, further comprising:
   a) a second retractable vane positioned between said first wall and said second wall, said second retractable vane positioned behind said first retractable vane, said second retractable vane comprising:
      i) a fin, said fin extending between said first wall and said second wall,
         A) said fin further comprising teeth like structures positioned at the distal end of said fin;
         B) a third guide piece positioned on a proximal side of a first side of said fin;
         C) a fourth guide piece positioned on said proximal side of a second side of said fin, such that the inside of said first guide piece and said second guide piece face each other;
      III) a first rivet hole in a bottom section of said first guide piece;
      iv) a second rivet hole in a bottom section of said second guide piece; and wherein
   b) a tension or torsion coil spring comprising a coil, a first arm, and a second arm, wherein said first arm of said coil spring resides on said floor of said platform and said second arm of said spring pushes on an the underside of the fin on the second retractable vane;
   c) an attachment mechanism, said attachment mechanism securely passing through said first hole of said first wall of said platform, said first rivet hole in said bottom section of said first guide piece, through said coiled spring, second rivet hole in said bottom section of said second guide piece, and said second hole of said second wall of said platform; and
   d) a continuation of said pull mechanism, said continuation of said pull mechanism passing through said hole in said fin, and continuing through said hole of said floor; said continuation of said pull mechanism comprising a second stop knot on a distal side of said fin, wherein said continuation of said pull mechanism is continued from a first stop knot behind said first retractable vane.

* * * * *